US007825073B2

(12) United States Patent
Welton et al.

(10) Patent No.: US 7,825,073 B2
(45) Date of Patent: *Nov. 2, 2010

(54) TREATMENT FLUIDS COMPRISING CLARIFIED XANTHAN AND ASSOCIATED METHODS

(75) Inventors: Thomas D. Welton, Duncan, OK (US); Michael W. Sanders, Duncan, OK (US); Jeffery L. Mundy, Duncan, OK (US); Sean R. Beach, Duncan, OK (US); Richard W. Pauls, Duncan, OK (US); Phillip C. Harris, Duncan, OK (US); Stanley J. Heath, Duncan, OK (US); David E. McMechan, Duncan, OK (US); Christina A. Parkinson, Anchorage, AK (US); Harold G. Walters, Duncan, OK (US); Jason E. Bryant, Duncan, OK (US); Trinidad Munoz, Duncan, OK (US); Rajesh K. Saini, Duncan, OK (US); Bobby J. Burns, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 402 days.

This patent is subject to a terminal disclaimer.

(21) Appl. No.: 11/891,511

(22) Filed: Aug. 10, 2007

(65) Prior Publication Data
US 2008/0039347 A1 Feb. 14, 2008

Related U.S. Application Data

(63) Continuation-in-part of application No. 10/889,860, filed on Jul. 13, 2004, now abandoned.

(51) Int. Cl.
*C09K 8/52* (2006.01)
*C09K 8/60* (2006.01)
*E21B 43/16* (2006.01)
*E21B 43/28* (2006.01)

(52) U.S. Cl. ............... 507/213; 166/305.1; 166/308.1; 166/308.2; 507/90; 507/209; 507/211

(58) Field of Classification Search ............. 507/213, 507/211, 209, 90; 166/305.1, 308.1, 308.2
See application file for complete search history.

(56) References Cited

U.S. PATENT DOCUMENTS

| 4,010,071 A | 3/1977 | Colegrove | 435/72 |
|---|---|---|---|
| 4,265,673 A | 5/1981 | Pace et al. | 106/175.1 |
| 4,299,825 A | 11/1981 | Lee | 514/54 |
| 4,502,540 A | 3/1985 | Byham | 166/270.1 |
| 4,887,670 A | 12/1989 | Lord et al. | 166/281 |
| 5,373,901 A | 12/1994 | Norman et al. | 166/300 |
| 5,458,197 A | 10/1995 | Chan | 166/304 |
| 5,723,416 A | 3/1998 | Liao | 507/110 |
| 5,759,964 A | 6/1998 | Shuchart et al. | 507/209 |
| 5,785,747 A | 7/1998 | Vollmer et al. | 106/194.2 |
| 5,799,734 A | 9/1998 | Norman et al. | 166/278 |
| 5,916,849 A | 6/1999 | House | 507/110 |
| 5,977,030 A | 11/1999 | House | 507/110 |
| 5,996,694 A | 12/1999 | Dewprashad et al. | 166/294 |
| 6,100,222 A | 8/2000 | Vollmer et al. | 507/113 |
| 6,110,875 A | 8/2000 | Tjon-Joe-Pin et al. | 507/201 |
| 6,123,159 A | 9/2000 | Brookey et al. | 175/72 |
| 6,148,917 A | 11/2000 | Brookey et al. | 166/301 |
| 6,302,209 B1 | 10/2001 | Thompson et al. | 166/305.1 |
| 6,315,045 B1 | 11/2001 | Brezinski | 166/300 |
| 6,355,600 B1 * | 3/2002 | Norfleet et al. | 507/120 |
| 6,422,326 B1 | 7/2002 | Brookey et al. | 175/72 |
| 6,432,155 B1 | 8/2002 | Swazey et al. | 74/27 |
| 6,444,316 B1 | 9/2002 | Reddy et al. | 428/407 |
| 6,454,008 B1 | 9/2002 | Chatterji et al. | 166/308.6 |
| 6,488,091 B1 | 12/2002 | Weaver et al. | 166/300 |
| 6,525,011 B2 | 2/2003 | Brezinski | 510/253 |
| 6,527,051 B1 | 3/2003 | Reddy et al. | 166/300 |
| 6,534,448 B1 | 3/2003 | Brezinski | 507/90 |
| 6,547,871 B2 | 4/2003 | Chatterji et al. | 106/672 |
| 6,554,071 B1 | 4/2003 | Reddy et al. | 166/293 |
| 6,566,310 B2 | 5/2003 | Chan | 507/211 |
| 6,586,213 B2 | 7/2003 | Kobzeff et al. | 435/104 |
| 6,640,898 B2 | 11/2003 | Lord et al. | 166/300 |
| 6,706,668 B2 | 3/2004 | Brezinski | 507/269 |
| 6,716,797 B2 | 4/2004 | Brookey | 507/102 |
| 6,806,235 B1 | 10/2004 | Mueller et al. | 507/138 |
| 6,877,563 B2 | 4/2005 | Todd et al. | 166/312 |

(Continued)

FOREIGN PATENT DOCUMENTS

| EP | 1 617 039 A1 | 7/2005 |
|---|---|---|
| GB | 2354541 A | 3/2001 |
| WO | WO 95/12741 | 5/1995 |

OTHER PUBLICATIONS

Xanvis® Sales Bulletin, Kelco Oil Field Group, Houston, TX, 2003.*
Whistler, R. L. et al. Editors, Industrial Gums Polysaccharides and Their Derivatives, Chapter 13 Xanthan, Welan, and Rhamsan, p. 380, Academic Press, 1993.*

(Continued)

*Primary Examiner*—Timothy J. Kugel
(74) *Attorney, Agent, or Firm*—Robert A. Kent; McDermott Will & Emery LLP

(57) ABSTRACT

Methods are provided that include a method comprising providing a viscosified treatment fluid comprising a base fluid and a gelling agent that comprises a clarified xanthan; and placing the viscosified treatment fluid into at least a portion of a subterranean formation. In some embodiments, the method comprises placing the viscosified treatment fluid into at least a portion of a subterranean formation at a pressure sufficient to create or enhance at least one fracture in the subterranean formation. In some embodiments, the viscosified treatment fluid may also comprise a plurality of particulates. In some embodiments, the viscosified treatment fluids may be placed into at least a portion of a pipeline. Additional methods are also provided.

18 Claims, 2 Drawing Sheets

U.S. PATENT DOCUMENTS

| | | | |
|---|---|---|---|
| 6,883,608 B2 | 4/2005 | Parlar et al. | 166/278 |
| 6,959,767 B2 | 11/2005 | Horton et al. | 166/403 |
| 6,987,083 B2 | 1/2006 | Phillippi et al. | 507/213 |
| 7,021,383 B2 | 4/2006 | Todd et al. | 166/307 |
| 7,101,829 B2 | 9/2006 | Guichard et al. | 507/120 |
| 7,147,067 B2 | 12/2006 | Getzlaf et al. | 175/64 |
| 7,148,185 B2 | 12/2006 | Fu et al. | 507/244 |
| 7,159,659 B2 | 1/2007 | Welton et al. | 166/307 |
| 7,256,159 B2 | 8/2007 | Guichard et al. | 507/120 |
| 2001/0016562 A1 | 8/2001 | Muir et al. | 507/201 |
| 2001/0027880 A1 | 10/2001 | Brookey | 175/65 |
| 2002/0031525 A1 | 3/2002 | Kobzeff et al. | 424/195.18 |
| 2002/0092652 A1 | 7/2002 | Chatterji et al. | 166/308 |
| 2003/0069141 A1* | 4/2003 | Norfleet et al. | 507/120 |
| 2003/0166472 A1 | 9/2003 | Pursley et al. | 507/200 |
| 2003/0236174 A1 | 12/2003 | Fu et al. | 507/200 |
| 2004/0023812 A1 | 2/2004 | England et al. | 507/100 |
| 2004/0129459 A1 | 7/2004 | Guichard et al. | 175/65 |
| 2004/0206494 A1* | 10/2004 | Stephenson et al. | 166/250.1 |
| 2004/0206498 A1 | 10/2004 | Phillippi et al. | 166/278 |
| 2004/0216882 A1 | 11/2004 | Horton et al. | 166/305.1 |
| 2004/0238169 A1 | 12/2004 | Todd et al. | 166/280.2 |
| 2005/0000734 A1 | 1/2005 | Getzlaf et al. | 175/73 |
| 2005/0028978 A1 | 2/2005 | Parlar et al. | 166/278 |
| 2006/0014648 A1 | 1/2006 | Milson et al. | 507/213 |
| 2006/0032636 A1* | 2/2006 | Lord et al. | 166/308.2 |
| 2006/0108150 A1 | 5/2006 | Luke et al. | 175/64 |
| 2006/0144592 A1* | 7/2006 | Hanes et al. | 166/279 |
| 2006/0180309 A1 | 8/2006 | Welton et al. | 166/282 |
| 2006/0180310 A1 | 8/2006 | Welton et al. | 166/283 |
| 2006/0183646 A1 | 8/2006 | Welton et al. | 507/259 |
| 2006/0234873 A1 | 10/2006 | Ballard | 507/211 |
| 2006/0278437 A1 | 12/2006 | Guichard et al. | 175/65 |
| 2007/0281868 A1* | 12/2007 | Pauls et al. | 507/213 |
| 2008/0039347 A1 | 2/2008 | Welton et al. | 507/213 |
| 2008/0078545 A1* | 4/2008 | Welton et al. | 166/278 |
| 2008/0202759 A1* | 8/2008 | Welton | 166/308.5 |
| 2008/0207470 A1* | 8/2008 | Welton | 507/209 |
| 2009/0042750 A1* | 2/2009 | Pauls et al. | 507/213 |

OTHER PUBLICATIONS

Biopolymers in Salt Solutions Technical Bulleting, Kelco Oil Field Group, 2001.*
BIOZAN GEO Products Book v. 6.1.0, GEO Drilling Fluids, Inc., pp. 7-8, No Date.*
Search Report and Written Opinion for International Application No. PCT/GB2008/002697, Aug. 8, 2008.
Foreign Counterpart Search Report Application No. 05254386.5, Nov. 28, 2005.
Office Action from U.S. Appl. No. 10/889,860, Jul. 6, 2007.
Office Action from U.S. Appl. No. 10/889,860, Jan. 12, 2007.

* cited by examiner

TREATMENT FLUIDS COMPRISING CLARIFIED XANTHAN AND ASSOCIATED METHODS

CROSS-REFERENCE TO RELATED APPLICATIONS

The present application is a continuation-in-part of U.S. patent application Ser. No. 10/889,860, now abandoned, entitled "Brine-Based Viscosified Treatment Fluids and Associated Methods," filed on Jul. 13, 2004, the entirety of which is herein incorporated by reference.

BACKGROUND

The present invention relates to methods and compositions for use in industrial, oilfield, and/or subterranean operations. More particularly, the present invention relates to viscosified treatment fluids comprising clarified xanthan gelling agents, and their use in industrial, oilfield, geothermal, coal, coal bed methane, and/or subterranean operations.

Treatment fluids may be used in a variety of subterranean treatments, including, but not limited to, stimulation treatments, damage removal, formation isolation, wellbore cleanout, scale removal, scale control, drilling operations, cementing, conformance treatments, water flooding operations for tertiary oil recovery, and sand control treatments. Treatment fluids may also be used in a variety of pipeline treatments. As used herein, the term "treatment," or "treating," refers to any operation that uses a fluid in conjunction with a desired function and/or for a desired purpose. The term "treatment," or "treating," does not imply any particular action by the fluid or any particular component thereof.

One common production stimulation operation that employs a treatment fluid is hydraulic fracturing. Hydraulic fracturing operations generally involve pumping a treatment fluid (e.g., a fracturing fluid) into a well bore that penetrates a subterranean formation at a sufficient hydraulic pressure to create or enhance one or more cracks, or "fractures," in the subterranean formation. "Enhancing" one or more fractures in a subterranean formation, as that term is used herein, is defined to include the extension or enlargement of one or more natural or previously created fractures in the subterranean formation. The treatment fluid may comprise particulates, often referred to as "proppant particulates," that are deposited in the fractures. The proppant particulates, inter alia, may prevent the fractures from fully closing upon the release of hydraulic pressure, forming conductive channels through which fluids may flow. The proppant particulates also may be coated with certain types of materials, including resins, tackifying agents, and the like, among other purposes, to enhance conductivity (e.g., fluid flow) through the fractures in which they reside. Once at least one fracture is created and/or enhanced, and the proppant particulates are substantially in place, the treatment fluid may be "broken" (i.e., the viscosity of the fluid is reduced), and the treatment fluid may be recovered from the formation.

Other common production stimulation operations that employ treatment fluids are acidizing operations. Where the subterranean formation comprises acid-soluble components, such as those present in carbonate and sandstone formations, stimulation and/or damage removal is often achieved by contacting the formation with a treatment fluid that comprises an acid or an acid generating material. For example, where hydrochloric acid contacts and reacts with calcium carbonate in a formation, the calcium carbonate is consumed to produce water, carbon dioxide, and calcium chloride. After acidization is completed, the water and salts dissolved therein may be recovered by producing them to the surface (e.g., "flowing back" the well), leaving a desirable amount of voids (e.g., wormholes) within the formation, which may enhance the formation's permeability and/or increase the rate at which hydrocarbons subsequently may be produced from the formation. One method of acidizing known as "fracture acidizing" comprises injecting a treatment fluid that comprises an acid into the formation at a pressure sufficient to create or enhance one or more fractures within the subterranean formation. Another method of acidizing known as "matrix acidizing" comprises injecting a treatment fluid that comprises an acid into the formation at a pressure below that which would create or enhance one or more fractures within the subterranean formation.

Treatment fluids are also utilized in sand control treatments, such as gravel packing. In "gravel-packing" treatments, a treatment fluid suspends particulates (commonly referred to as "gravel particulates"), and deposits at least a portion of those particulates in a desired area in a well bore, e.g., near unconsolidated or weakly consolidated formation zones, to form a "gravel pack," which is a grouping of particulates that are packed sufficiently close together so as to prevent the passage of certain materials through the gravel pack. This "gravel pack" may, inter alia, enhance sand control in the subterranean formation and/or prevent the flow of particulates from an unconsolidated portion of the subterranean formation (e.g., a propped fracture) into a well bore. One common type of gravel-packing operation involves placing a sand control screen in the well bore and packing the annulus between the screen and the well bore with the gravel particulates of a specific size designed to prevent the passage of formation sand. The gravel particulates act, inter alia, to prevent the formation sand from occluding the screen or migrating with the produced hydrocarbons, and the screen acts, inter alia, to prevent the particulates from entering the well bore. The gravel particulates also may be coated with certain types of materials, including resins, tackifying agents, and the like, among other purposes, to enhance conductivity (e.g., fluid flow) through the gravel pack in which they reside. Once the gravel pack is substantially in place, the viscosity of the treatment fluid may be reduced to allow it to be recovered. In some situations, fracturing and gravel-packing treatments are combined into a single treatment (commonly referred to as "FracPac™", operations, frac pack, or frac and pack operations). In such "frac pack" operations, the treatments are generally completed with a gravel pack screen assembly in place with the hydraulic fracturing treatment being pumped through the annular space between the perforated casing and screen. In this situation, the hydraulic fracturing treatment ends in a screen-out condition, creating an annular gravel pack between the screen and casing. In other cases, the fracturing treatment may be performed prior to installing the screen and placing a gravel pack.

Maintaining sufficient viscosity in the treatment fluids used in these operations is important for a number of reasons. Maintaining sufficient viscosity is important in fracturing and sand control treatments for particulate transport and/or to create or enhance fracture width. Also, maintaining sufficient viscosity may be important in acidizing treatments, in friction reduction and to control and/or reduce fluid loss into the formation. Moreover, a treatment fluid of a sufficient viscosity may be used to divert the flow of fluids present within a subterranean formation (e.g., formation fluids, other treatment fluids) to other portions of the formation, for example, by invading the higher permeability portions of the formation with a fluid that has high viscosity at low shear rates. To further increase the viscosity of a treatment fluid, often the molecules of the gelling agent are "crosslinked" with the use of a crosslinking agent. Conventional crosslinking agents usually comprise a metal complex or compound that interacts with at least two polymer molecules to form a "crosslink" between them.

To provide the desired viscosity, polymeric gelling agents commonly are added to the treatment fluids. Examples of commonly used polymeric gelling agents include, but are not limited to, biopolymers, polysaccharides such as guar gums and derivatives thereof, cellulose derivatives, synthetic polymers, and the like. These gelling agents, when hydrated and at a sufficient concentration, are capable of forming a viscous solution. When used to make an aqueous-based viscosified treatment fluid, a gelling agent is combined with an aqueous fluid and the soluble portions of the gelling agent are dissolved in the aqueous fluid, thereby increasing the viscosity of the fluid. However, the insoluble portions of the gelling agents (referred to herein as "residue"), such as proteins, cellulose and fibers, remain in the aqueous fluid and enter the pores of the subterranean zones being treated as well as gravel packs and proppant packs in the zones. The presence of this residue may impair the producing capabilities and/or the permeability of the subterranean formation and is therefore undesirable.

In addition, although certain viscosified treatment fluids may be desirable because of their advantageous properties, such as sand transport properties, long-lasting viscosity, desirable shear thinning characteristics, and efficient breaking properties, it may not be practicable to use such gelling agents if the aqueous base fluid is a brine. The term "brine" as used herein refers to various mixtures of aqueous fluids and salt(s). For example, when a brine is used in conjunction with certain gelling agents, the insoluble portions of the gelling agents may agglomerate in the presence of certain salts, such as potassium chloride, thereby making it difficult to achieve the desired viscosity. Furthermore, the agglomeration of insoluble portions of the gelling agent may also prevent effective filtration of the viscosified fluid.

SUMMARY

The present invention relates to methods and compositions for use in industrial, oilfield, and/or subterranean operations. More particularly, the present invention relates to viscosified treatment fluids comprising clarified xanthan gelling agents, and their use in industrial, oilfield, geothermal, coal, coal bed methane, and/or subterranean operations.

In one embodiment, the present invention provides a method comprising providing a viscosified treatment fluid comprising a base fluid and a gelling agent that comprises a clarified xanthan; and placing the viscosified treatment fluid into at least a portion of a subterranean formation.

In another embodiment, the present invention provides a method comprising providing a viscosified treatment fluid comprising a base fluid and a gelling agent that comprises a clarified xanthan; and placing the viscosified treatment fluid into at least a portion of a subterranean formation at a pressure sufficient to create or enhance at least one fracture in the subterranean formation.

In yet another embodiment, the present invention provides a method comprising providing a viscosified treatment fluid comprising a base fluid, a plurality of particulates, and a gelling agent that comprises a clarified xanthan; and placing the viscosified treatment fluid into at least a portion of a subterranean formation.

In yet another embodiment, the present invention provides a method comprising providing a viscosified treatment fluid comprising a base fluid and a gelling agent that comprises a clarified xanthan; and placing the viscosified treatment fluid into at least a portion of a pipeline.

The features and advantages of the present invention will be apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

Figure 1:
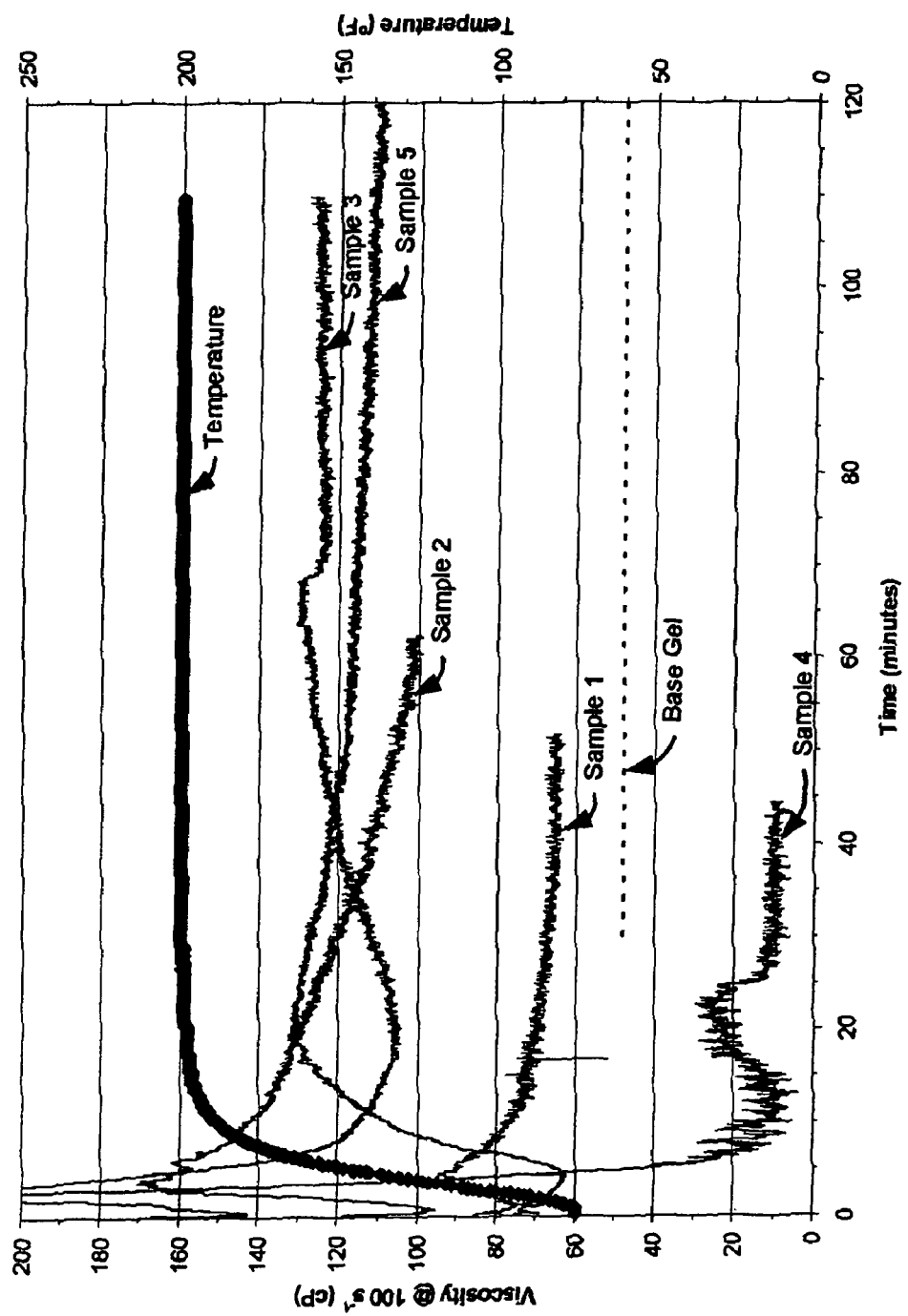
FIG. 1 illustrates the rheological properties of a treatment fluid of the present invention.
Figure 2:
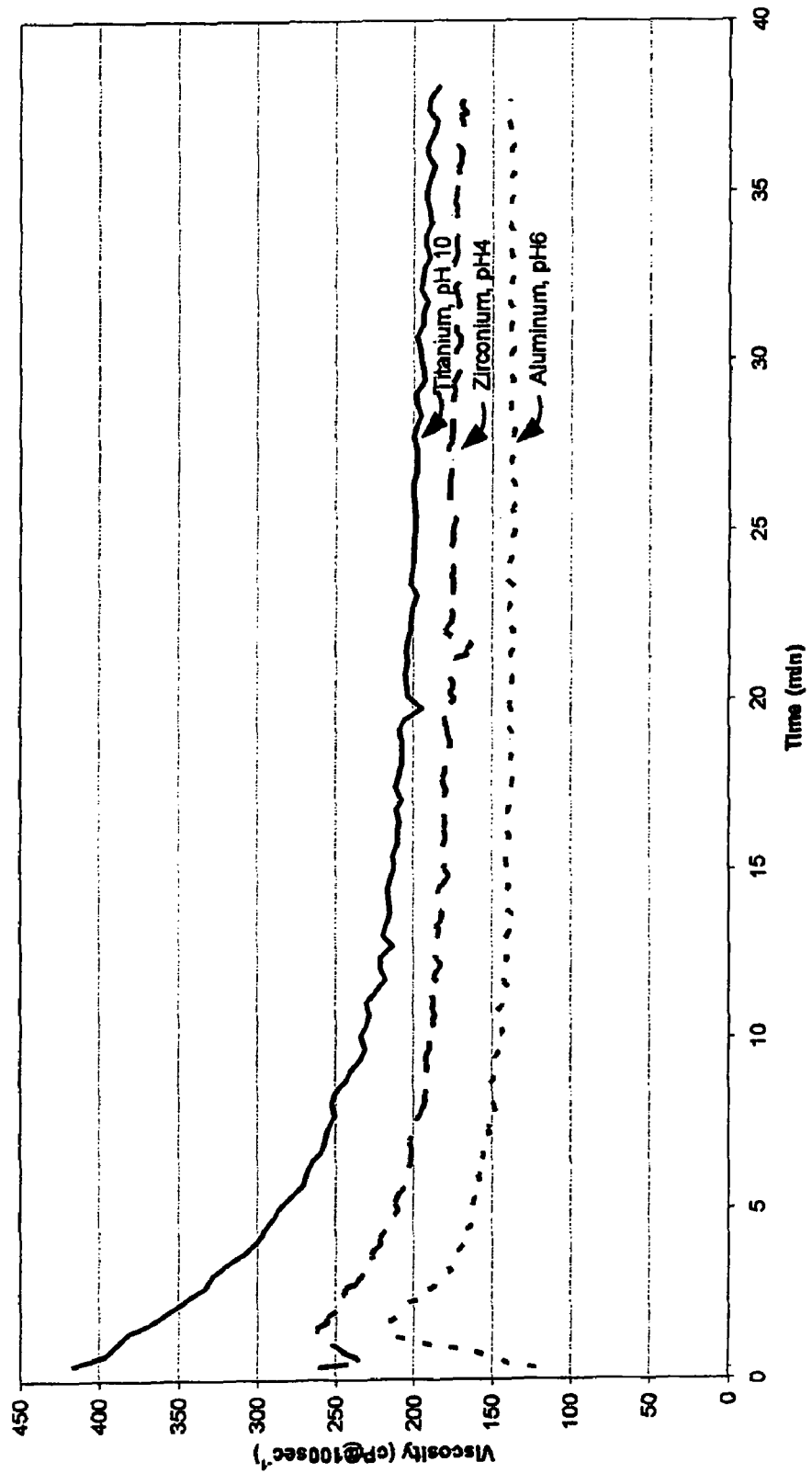
FIG. 2 illustrates the rheological properties of a treatment fluid of the present invention.

The present invention relates to methods and compositions for use in industrial, oilfield, and/or subterranean operations. More particularly, the present invention relates to viscosified treatment fluids comprising clarified xanthan gelling agents, and their use in industrial, oilfield, geothermal, coal, coal bed methane, and/or subterranean operations.

In certain embodiments, the present invention may provide compositions and methods that are especially suitable for use in well bores comprising bottom-hole temperatures ("BHTs") of about 30° F. to about 300° F. One of the many advantages of the viscosified treatment fluids of the present invention is that they may comprise decreased levels of residue as compared to traditional viscosified treatment fluids, and also may provide enhanced filtration properties, better permeability regain and/or an increased rate of hydration. In addition, the viscosified treatment fluids of the present invention may be exceptional in that, in certain embodiments, the fluids can hold particulates in what may be characterized as possibly almost perfect suspension under static conditions for many hours to possibly days. The temperatures to which the fluids are subjected can affect their particulate transport properties, depending on the concentration of the clarified xanthan gelling agent in the fluid as well as other components. Furthermore, another potential advantage of the fluids of the present invention is that they may be shear thinning fluids and that in certain embodiments, the viscosified treatment fluids of the present invention are visually homogenous, e.g., substantially no lumping.

The viscosified treatment fluids of the present invention generally comprise a base fluid and a gelling agent that comprises a clarified xanthan. The term "clarified xanthan" as used herein refers to a xanthan that has a flow rate of at least about 200 ml in 2 minutes at ambient temperature in a filtering laboratory test on a Baroid Filter Press using 40 psi of differential pressure and a 9 cm Whatman filter paper having a 2.7μ pore size. This definition controls the meaning of the term clarified xanthan in the claims of this application, particularly over any other definition found in any reference, patent or patent application, whether or not referenced herein. In some embodiments, suitable clarified xanthans are capable of hydrating in a brine to produce an increase in viscosity.

In some embodiments, suitable clarified xanthans may have been treated with enzymes or the like to remove residual cellular structures, such as cell walls. In some embodiments, suitable clarified xanthans may be produced from genetically modified or bioengineered strains of bacteria or other strains of bacteria that allow the clarified xanthan to have improved functional properties such as filterability, turbidity, etc. In one embodiment, suitable clarified xanthans may be modified by genetic engineering or bacteria selection or the result of chemical treatment or derivatization of a xanthan. An example of such a modification would be where a portion of the xanthan is oxidized or hydrolyzed. In one embodiment, the clarified xanthan may be modified, such as nonacetylated and/or nonpyruvylated xanthan. As used herein, "nonacetylated" means having fewer acetyl groups than typical xanthan, whether the difference is the result of genetic engineering or bacteria selection or the result of chemical treatment of a typical xanthan. As used herein, "nonpyruvylated" means having fewer pyruvyl groups, whether the difference is the result of genetic engineering or bacteria selection or the result of chemical treatment of a xanthan. Furthermore, as used herein, nonpruvylated and nonacetylated are intended to encompass depruvylated and deacetylated, respectively. Another example of modified xanthan is partially oxidized xanthan. Suitable clarified xanthan may also be present in a form that will only partially hydrate or will not hydrate at ambient temperature. This form of clarified xanthan may be chemically modified, chemically coated, genetically modified, or produced from a new strain of bacteria.

Additionally, suitable clarified xanthans are generally compatible with and stable in systems containing salts, e.g., they will fully hydrate in systems comprising salts. Moreover, suitable clarified xanthans should have good filterability and provide good suspension for particulates often used in subterranean applications, such as proppant or gravel. Commercially available examples of a suitable clarified xanthan for use in conjunction with the present invention are KELTROL T and KELTROL BT from CP Kelco, which are available from various locations including Chicago, Ill.

The gelling agent comprising clarified xanthan may be provided in any form that is suitable for the particular treatment fluid and/or application of the present invention. In certain embodiments, the gelling agent may be provided as a liquid, gel, suspension, and/or solid additive that is admixed or incorporated into a treatment fluid used in conjunction with the present invention. The gelling agent may also be present in a solid particulate form of any size or shape. For example, larger sized particulates of spherical shape may be used, inter alia, to form perforation tunnel blocking particles, similar to perforation pack balls. Similarly, smaller sized particulates may be used, inter alia, as a fluid loss control material that may act to bridge natural fractures or other channels. The gelling agent should be present in a viscosified treatment fluid of the present invention in an amount sufficient to impart the desired viscosity (e.g., sufficient viscosity to divert flow, suspend particulates, provide friction reduction, etc.) to a treatment fluid. More specifically, in some embodiments, the amount of gelling agent used in the viscosified treatment fluids of the present invention may vary from about 0.25 pounds per 1000 gallons of treatment fluid ("lbs/Mgal") to about 200 lbs/Mgal. In other embodiments, the amount of gelling agent included in the treatment fluids of the present invention may vary from about 30 lbs/Mgal to about 80 lbs/Mgal. In another embodiment, about 60 lbs/Mgal of a gelling agent is included in a treatment fluid of the present invention. It should be noted that in well bores comprising bottom hole temperatures of 200° F. or more, 70 lbs/Mgal or more of the gelling agent may be beneficially used in a treatment fluid of the present invention. In embodiments in which the amount of clarified xanthan approaches 200 lbs/Mgal, the clarified xan-
than may act to increase the viscosity of the treatment fluid so that the treatment fluid may be used as a diverting fluid, fluid loss pill to seal a formation, or as a chemical pig in a pipeline.

Optionally, the gelling agents of the present invention may comprise an additional biopolymer if the use of the clarified xanthan and the biopolymer produces a desirable result, e.g., a synergistic effect. Suitable biopolymers may include polysaccharides and galactomannan gums. Depending on the application, one biopolymer may be more suitable than another. One of ordinary skill in the art with the benefit of this disclosure will be able to determine if a biopolymer should be included for a particular application based on, for example, the desired viscosity of the viscosified treatment fluid and the bottom hole temperature ("BHT") of the well bore.

Suitable base fluids for use in the present invention include aqueous base fluids and nonaqueous base fluids. Suitable aqueous base fluids that may be used in the viscosified treatment fluids of the present invention may include fresh water, salt water, brine, formation brine, seawater, or any other aqueous fluid that, preferably, does not adversely interact with the other components used in accordance with this invention or with the subterranean formation. The aqueous base fluid preferably is present in the viscosified treatment fluids of the present invention in an amount sufficient to substantially hydrate the gelling agent to form a viscosified treatment fluid. Suitable nonaqueous base fluids that may be used in the viscosified treatment fluids of the present invention may include glycerol, glycol, polyglycols, ethylene glycol, propylene glycol, and dipropylene glycol methyl ether. Other examples of suitable nonaqueous base fluids that may be used in the present invention are disclosed in U.S. Pat. No. 6,632,779, the relevant disclosure of which is herein incorporated by reference. In some embodiments, the base fluid may be present in the viscosified treatment fluids of the present invention in an amount in the range from about 5% to 99.99% by volume of the treatment fluid.

In some embodiments, the base fluids suitable for use in the viscosified treatment fluids of the present invention may be a foamed fluid (e.g., a liquid that comprises a gas such as nitrogen, carbon dioxide, air or methane). As used herein, the term "foamed" also refers to co-mingled fluids. In certain embodiments, it may desirable that the base fluid is foamed to, inter alia, reduce the amount of base fluid that is required, e.g. in water sensitive subterranean formations, to reduce fluid loss to the subterranean formation, and/or to provide enhanced proppant suspension. In addition, in certain embodiments where the viscosified treatment fluids of the present invention are used for fluid diversion, it may be desirable that the viscosified treatment be foamed. While various gases can be utilized for foaming the treatment fluids of this invention, nitrogen, carbon dioxide, and mixtures thereof are preferred. In examples of such embodiments, the gas may be present in a viscosified treatment fluid of the present invention in an amount in the range of from about 5% to about 98% by volume of the treatment fluid, and more preferably in the range of from about 20% to about 80%. The amount of gas to incorporate into the fluid may be affected by factors including the viscosity of the fluid and wellhead pressures involved in a particular application. One example of a foamed fluid suitable for use with the present invention are those disclosed in U.S. patent application Ser. No. 11/506,703, the relevant disclosure of which is herein incorporated by reference.

If desired, the viscosified treatment fluids of the present invention may also be used in the form of an emulsion. An example of a suitable emulsion may comprise an aqueous base fluid comprising a clarified xanthan gelling agent and a suitable hydrocarbon. In some embodiments, the emulsion may comprise approximately 30% of an aqueous base fluid and 70% of a suitable hydrocarbon. In some embodiments, the external phase of the emulsion may be aqueous. In certain embodiments, it may be desirable to use an emulsion to, inter alia, reduce fluid loss to the subterranean formation, and/or to provide enhanced proppant suspension. Other benefits and advantages to using emulsions in the methods of the present invention will be evident to one of ordinary skill in the art.

The viscosified treatment fluids of the present invention may vary widely in density. One of ordinary skill in the art with the benefit of this disclosure will recognize the particular density that is most appropriate for a particular application. In some embodiments, the density of the non-foamed viscosified treatment fluids of the present invention generally may approximate the density of water. In other embodiments, the density of the non-foamed viscosified treatment fluids of the present invention generally may range from about 8.3 pounds per gallon ("ppg") to about 30 ppg. One of ordinary skill in the art with the benefit of this disclosure will recognize that the density of any particular treatment fluid of the present invention may also vary depending on the addition of certain additives, including, but not limited to, inorganic salts, proppant, gas, fluid loss control additives, alcohols, glycols, and/or hydrocarbons. Furthermore, the desired density for a particular viscosified treatment fluid may depend on characteristics of the subterranean formation, including, inter alia, the hydrostatic pressure required to control the fluids of the subterranean formation during placement of the viscosified treatment fluids, and the hydrostatic pressure which may damage the subterranean formation. For example, if the viscosified treatment fluid remains in the well bore, the density of the viscosified treatment fluid may be adjusted to, inter alia, prevent the changing of position of a fluid relative to another fluid with a different density, thereby leaving the viscosified treatment fluid at the correct placement within the well bore.

In some embodiments, the viscosified treatment fluid may comprise a brine. Brines suitable for use in some embodiments of the present invention may include those that comprise monovalent, divalent, or trivalent cations. Some divalent or trivalent cations, such as magnesium, calcium, iron, and zinc, may, in some concentrations and at some pH levels, cause undesirable crosslinking of a xanthan polymer. If a water source is used which contains such divalent or trivalent cations in concentrations sufficiently high to be problematic, then such divalent or trivalent salts may be removed, either by a process such as reverse osmosis, or by raising the pH of the water in order to precipitate out such salts to lower the concentration of such salts in the water before the water is used. Another method would be to include a chelating agent to chemically bind the problematic ions to prevent their undesirable interactions with the xanthan. As used herein, the term "chelating agent" or "chelant" also refers to sequestering agents and the like. Suitable chelants include, but are not limited to, citric acid or sodium citrate. Other chelating agents also are suitable. Brines, where used, may be of any weight. Examples of suitable brines include calcium bromide brines, zinc bromide brines, calcium chloride brines, sodium chloride brines, sodium bromide brines, potassium bromide brines, potassium chloride brines, sodium nitrate brines, sodium formate brines, potassium formate brines, cesium formate brines, magnesium chloride brines, sodium sulfate, potassium nitrate, mixtures thereof, and the like. The brine chosen should be compatible with the formation and should have a sufficient density to provide the appropriate degree of well control. Additional salts may be added to a water source, e.g., to provide a brine, and a resulting viscosified treatment fluid, having a desired density. The amount of salt that should be added should be the amount necessary for formation compatibility, such as the amount necessary for the stability of clay minerals, taking into consideration the crystallization temperature of the brine, e.g., the temperature at which the salt precipitates from the brine as the temperature drops. Preferred suitable brines may include seawater and/or formation brines. The gelling agents of the present invention may be used successfully with seawater.

In certain embodiments, the viscosified treatment fluids of the present invention also may optionally comprise salts, pH control additives, surfactants, breakers, bactericides, crosslinkers, fluid loss control additives, stabilizers, chelants, scale inhibitors, paraffin inhibitors, asphaltene inhibitors, mutual solvents, solvents, corrosion inhibitors, hydrate inhibitors, clay stabilizers, salt substitutes (such as tetramethyl ammonium chloride), relative permeability modifiers (such as HPT-1™ chemical additive available from Halliburton Energy Services, Duncan, Okla.), sulfide scavengers, fibers, nanoparticles, consolidating agents (such as resins and/or tackifiers), combinations thereof, or the like.

Salts may optionally be included in the treatment fluids of the present invention for many purposes, including, for reasons related to compatibility of the viscosified treatment fluid with the formation and formation fluids. To determine whether a salt may be beneficially used for compatibility purposes, a compatibility test may be performed to identify potential compatibility problems. From such tests, one of ordinary skill in the art with the benefit of this disclosure will be able to determine whether a salt should be included in a treatment fluid of the present invention. Suitable salts include, but are not limited to, calcium chloride, sodium chloride, magnesium chloride, potassium chloride, sodium bromide, potassium bromide, ammonium chloride, sodium formate, potassium formate, cesium formate, mixtures thereof, and the like. The amount of salt that should be added should be the amount necessary for the required density for formation compatibility, such as the amount necessary for the stability of clay minerals, taking into consideration the crystallization temperature of the brine, e.g., the temperature at which the salt precipitates from the brine as the temperature drops. Salt may also be included to increase the viscosity of and stabilize the fluid particularly at temperatures above 180° F.

Examples of suitable pH control additives which may optionally be included in the treatment fluids of the present invention are acid compositions and/or bases. A pH control additive may be necessary to maintain the pH of the treatment fluid at a desired level, e.g., to improve the effectiveness of certain breakers and to reduce corrosion on any metal present in the well bore or formation, etc. In some instances, it may be beneficial to maintain the pH at neutral or above 7. For example, in certain embodiments, increasing the pH to 7 or above will give additional stability to the fluid at higher temperatures. In some embodiments, the pH may be lowered to about pH 7 or below to increase the proppant transport capability of the fluid. In some embodiments where the treatment fluid comprises crosslinked clarified xanthan, it may be desirable to maintain the pH between approximately 4 and 11. One of ordinary skill in the art with the benefit of this disclosure will be able to recognize a suitable pH for a particular application.

In one embodiment, the pH control additive may be an acid composition. Examples of suitable acid compositions may comprise an acid, an acid generating compound, and combinations thereof. Any known acid may be suitable for use with the treatment fluids of the present invention. Examples of acids that may be suitable for use in the present invention include, but are not limited to organic acids (e.g., formic acids, acetic acids, carbonic acids, citric acids, glycolic acids, lactic acids, ethylenediaminetetraacetic acid ("EDTA"), hydroxyethyl ethylenediamine triacetic acid ("HEDTA"), and the like), inorganic acids (e.g., hydrochloric acid, hydrofluoric acid, phosphonic acid, p-toluenesulfonic acid, and the like), and combinations thereof.

Examples of acid generating compounds that may be suitable for use in the present invention include, but are not limited to, esters, aliphatic polyesters, ortho esters, which may also be known as ortho ethers, poly (ortho esters), which may also be known as poly(ortho ethers), poly(lactides), poly (glycolides), poly(ε-caprolactones), poly(hydroxybutyrates), poly(anhydrides), or copolymers thereof. Derivatives and combinations also may be suitable. The term "copolymer" as used herein is not limited to the combination of two polymers, but includes any combination of polymers, e.g., terpolymers and the like. Other suitable acid-generating compounds include: esters including, but not limited to, ethylene glycol monoformate, ethylene glycol diformate, diethylene glycol diformate, glyceryl monoformate, glyceryl diformate, glyceryl triformate, triethylene glycol diformate and formate esters of pentaerythritol. An example of a suitable acid generating compound is a citrate ester commercially available from Halliburton Energy Services, Inc., of Duncan, Okla., under the tradename MATRIXFLO™ II Breaker. Other suitable materials may be disclosed in U.S. Pat. Nos. 6,877,563 and 7,021,383, the disclosures of which are incorporated by reference.

The pH control additive also may comprise a base to elevate the pH of the viscosified treatment fluid. Generally, a base may be used to elevate the pH of the mixture to greater than or equal to about 7. Having the pH level at or above 7 may have a positive effect on a chosen breaker being used and may also inhibit the corrosion of any metals present in the well bore or formation, such as tubing, sand screens, etc. In addition, having a pH greater than 7 may also impart greater stability to the viscosity of the viscosified treatment fluid, thereby enhancing the length of time that viscosity can be maintained. This could be beneficial in certain uses, such as in longer-term well control and in diverting. Any known base that is compatible with the gelling agents of the present invention can be used in the viscosified treatment fluids of the present invention. Examples of suitable bases include, but are not limited to, sodium hydroxide, potassium carbonate, potassium hydroxide, sodium carbonate, and sodium bicarbonate. An example of a suitable base is a solution of 25% sodium hydroxide commercially available from Halliburton Energy Services, Inc., of Duncan, Okla., under the tradename MO-67™ pH control agent. Another example of a suitable base solution is a solution of potassium carbonate commercially available from Halliburton Energy Services, Inc., of Duncan, Okla., under the tradename BA-40L™ buffering agent. One of ordinary skill in the art with the benefit of this disclosure will recognize the suitable bases that may be used to achieve a desired pH elevation.

In some embodiments, the viscosified treatment fluid may optionally comprise a chelating agent. When added to the treatment fluids of the present invention, the chelating agent may chelate any dissolved iron (or other divalent or trivalent cation) that may be present in the aqueous fluid. Such chelating may prevent such ions from crosslinking the gelling agent molecules. Such crosslinking may be problematic because, inter alia, it may cause filtration problems, injection problems, and/or cause regain permeability problems. Any suitable chelating agent may be used with the present invention. Examples of suitable chelating agents include, but are not limited to, an anhydrous form of citric acid, commercially available under the tradename FE-2™ Iron Sequestering Agent from Halliburton Energy Services, Inc., of Duncan, Okla. Another example of a suitable chelating agent is a solution of citric acid dissolved in water, commercially available under the tradename FE-2A™ buffering agent from Halliburton Energy Services, Inc., of Duncan, Okla. Other chelating agents that may be suitable for use with the present invention include, inter alia, nitrilotriacetic acid ("NTA"), any form of ethylene diamine tetracetic acid ("EDTA"), hydroxyethylethylenediaminetriacetic acid ("HEDTA"), dicarboxymethyl glutamic acid tetrasodium salt ("GLDA"), diethylenetriaminepentaacetic acid ("DTPA"), propylenediaminetetraacetic acid ("PDTA"), ethylenediamindi(o-hydroxyphenylacetic) acid ("EDDHA"), glucoheptonic acid, gluconic acid, sodium citrate, phosphonic acid, salts thereof, and the like. In some embodiments, the chelating agent may be a sodium or potassium salt. Generally, the chelating agent may be present in an amount sufficient to prevent crosslinking of the gelling agent molecules by any free iron (or any other divalent or trivalent cation) that may be present. In one embodiment, the chelating agent may be present in an amount of from about 0.02% to about 50.0% by weight of the treatment fluid. In another embodiment, the chelating agent is present in an amount in the range of from about 0.02% to about 2.0% by weight of the treatment fluid. One of ordinary skill in the art with the benefit of this disclosure will be able to determine the proper concentration of a chelating agent for a particular application.

In some embodiments, the viscosified treatment fluids of the present invention may include a surfactant, e.g., to improve the compatibility of the viscosified treatment fluids of the present invention with other fluids (like any formation fluids) that may be present in the well bore. One of ordinary skill in the art with the benefit of this disclosure will be able to identify the type of surfactant as well as the appropriate concentration of surfactant to be used. Suitable surfactants may be used in a liquid or powder form. Where used, the surfactants may be present in the viscosified treatment fluid in an amount sufficient to prevent incompatibility with formation fluids, other treatment fluids, or well bore fluids. In an embodiment where liquid surfactants are used, the surfactants are generally present in an amount in the range of from about 0.01% to about 5.0% by volume of the viscosified treatment fluid. In one embodiment, the liquid surfactants are present in an amount in the range of from about 0.1% to about 2.0% by volume of the viscosified treatment fluid. In embodiments where powdered surfactants are used, the surfactants may be present in an amount in the range of from about 0.001% to about 0.5% by weight of the viscosified treatment fluid. Examples of suitable surfactants are non-emulsifiers commercially available from Halliburton Energy Services, Inc., of Duncan, Okla., under the tradenames LOSURF-259™ nonionic nonemulsifier, LOSURF-300™ nonionic surfactant, LOSURF-357™ nonionic surfactant, and LOSURF-400™ surfactant. Another example of a suitable surfactant is a non-emulsifier commercially available from Halliburton Energy Services, Inc., of Duncan, Okla., under the tradename NEA-96M™ surfactant.

In some embodiments, the surfactant may be a viscoelastic surfactant. These viscoelastic surfactants may be cationic, anionic, nonionic, amphoteric, or zwitterionic in nature. The viscoelastic surfactants may comprise any number of different compounds, including methyl ester sulfonates (e.g., as described in U.S. Patent Application Nos. 2006/0180310, 2006/0180309, 2006/0183646 and U.S. Pat. No. 7,159,659, the relevant disclosures of which are incorporated herein by reference), hydrolyzed keratin (e.g., as described in U.S. Pat.

No. 6,547,871, the relevant disclosure of which is incorporated herein by reference), sulfosuccinates, taurates, amine oxides, ethoxylated amides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), betaines, modified betaines, alkylamidobetaines (e.g., cocoamidopropyl betaine), quaternary ammonium compounds (e.g., trimethyltallowammonium chloride, trimethylcocoammonium chloride), derivatives thereof, and combinations thereof.

It should be noted that, in some embodiments, it may be beneficial to add a surfactant to a treatment fluid of the present invention as that fluid is being pumped downhole to help eliminate the possibility of foaming. However, in those embodiments where it is desirable to foam the treatment fluids of the present invention, surfactants such as HY-CLEAN (HC-2)™ surface-active suspending agent or AQF-2™ additive, both commercially available from Halliburton Energy Services, Inc., of Duncan, Okla., may be used. Additional examples of foaming agents that may be utilized to foam and stabilize the treatment fluids of this invention include, but are not limited to, betaines, amine oxides, methyl ester sulfonates, alkylamidobetaines such as cocoamidopropyl betaine, alpha-olefin sulfonate, trimethyltallowammonium chloride, C8 to C22 alkylethoxylate sulfate and trimethylcocoammonium chloride. Other suitable surfactants that may or may not be foamers in a particular application that are available from Halliburton Energy Services include: 19N, G-SPERSE dispersant, HOWCO-SUDS™ foaming agent, and A-SPERSE™ dispersing aid for acid additives. Other suitable foaming agents and foam stabilizing agents may be included as well, which will be known to those skilled in the art with the benefit of this disclosure.

In other embodiments, it may be desirable to emulsify the treatment fluid with a hydrocarbon, forming a aqueous phase external emulsion. In these embodiments, an emulsifying surfactant would be used. One example of a suitable emulsifying surfactant includes a nonionic surfactant such as a sorbitan ester. SEM-7™ emulsifier, available from Halliburton Energy Services in Duncan, Okla. is an example of another suitable surfactant. If a surfactant is used, generally an amount from about 0.1% to about 3% based on volume is sufficient. In some embodiments, the emulsion can be mixed and then pumped. In other embodiments, the components can be pumped and then mixed down hole.

Furthermore, in some embodiments, microemulsion additives may optionally be included in the treatment fluids of the present invention. Examples of suitable microemulsion additives include, but are not limited to, PEN-88M™ surfactant, PEN-88HT™ surfactant, SSO-21E surfactant, SSO-21 MW™ surfactant, GASPERM 1000™ microemulsion surfactant/solvent additive, which are all commercially available from Halliburton Energy Services, Inc., of Duncan, Okla. Other suitable microemulsion additives are MA-845 additive and MA-844 additive, commercially available from CESI Chemical of Duncan, Okla.; SHALESURF 1000 additive, commercially available from Frac Tech Services of Aledo, Tex.; and those disclosed in U.S. Patent Publication No. 2003/0166472, the relevant disclosure of which is incorporated by reference.

In some embodiments, the viscosified treatment fluids of the present invention may contain bactericides, inter alia, to protect both the subterranean formation as well as the viscosified treatment fluid from attack by bacteria. Such attacks may be problematic because they may lower the viscosity of the viscosified treatment fluid, resulting in poorer performance, such as poorer sand suspension properties, for example. Any bactericides known in the art are suitable. An artisan of ordinary skill with the benefit of this disclosure will be able to identify a suitable bactericide and the proper concentration of such bactericide for a given application. Examples of suitable bactericides include, but are not limited to, a 2,2-dibromo-3-nitrilopropionamide, commercially available under the tradename BE-3S™ biocide from Halliburton Energy Services, Inc., of Duncan, Okla., and a 2-bromo-2-nitro-1,3-propanediol commercially available under the tradename BE-6™ biocide from Halliburton Energy Services, Inc., of Duncan, Okla. In one embodiment, the bactericides are present in the viscosified treatment fluid in an amount in the range of from about 0.001% to about 1.0% by weight of the viscosified treatment fluid. In certain embodiments, when bactericides are used in the viscosified treatment fluids of the present invention, they may be added to the viscosified treatment fluid before the gelling agent is added.

The viscosified treatment fluids of the present invention optionally may comprise a suitable crosslinker to crosslink the clarified xanthan gelling agent in the viscosified treatment fluid. Crosslinking may be desirable at higher temperatures and/or when the sand suspension properties of a particular fluid of the present invention may need to be altered for a particular purpose. In addition, crosslinking may be beneficial when using the viscosified treatment fluids of the present invention to seal formation zones from loss of fluid from the well bore, when used in water flooding or water control treatments, or when used as a pig for pipeline cleaning. Suitable crosslinkers or compounds that produce an apparent crosslink include, but are not limited to, boron derivatives and salts thereof; aluminum derivatives and salts thereof; salts of perborates, including but not limited to sodium perborate; salts of permanganates, including but not limited to potassium permanganate, magnesium permanganate, sodium permanganate, and calcium permanganate; salts of percarbonates including but not limited to sodium percarbonate and potassium percarbonate; sodium persulfate; potassium persulfate; ammonium persulfate; calcium peroxide; magnesium peroxide; ferric iron complexes and compounds; magnesium complexes and compounds; zirconium complexes and compounds; and titanium complexes and compounds; calcium derivatives; chrome; mercury; arsenic; tin; lead; antimony; barium; calcium; copper; nickel; zinc; glutaraldehyde; amines, such as triethanolamine; combinations thereof and the like. Another example of suitable crosslinkers are those disclosed in U.S. patent application Ser. No. 11/502,656, the relevant disclosure of which is herein incorporated by reference. Any crosslinker that is compatible with the gelling agent may be used. One of ordinary skill in the art with the benefit of this disclosure will recognize when such crosslinkers are appropriate and what particular crosslinker will be most suitable.

In one embodiment, the viscosified treatment fluids of the present invention comprise a crosslinker that comprises a borate salt and guar or guar derivatives. It is believed that the crosslinking rate of xanthan by borate salts may be greatly increased by the presence of the guar or guar derivative. In certain embodiments where it may be desirable to crosslink the gelling agent of the present invention, the crosslinker may comprise a borate salt and guar or guar derivative present in the amount in the range of approximately 5% to 50% by weight of the xanthan gelling agent.

In some embodiments where it may be desirable to include a crosslinker in the treatment fluids of the present invention, a crosslinker and any other additives may be added to the base fluid before the gelling agent is added to the base fluid. After the addition of a crosslinker and/or additional additives to the base fluid, the gelling agent comprising clarified xanthan may be added to the base fluid, either on the surface to fully prepare the fluid before the fluid is placed into the subterranean formation, or by adding the gelling agent to the treatment fluid "on-the-fly" as the treatment fluid is being placed into the subterranean formation. The gelling agent comprising clarified xanthan will hydrate before crosslinking occurs, thus yielding a crosslinked gel downhole. In other embodiments, the gelling agent comprising clarified xanthan may be hydrated prior to the addition of the crosslinker. One of ordinary skill in the art with the benefit of this disclosure will recognize when it may be necessary for the gelling agent to be hydrated prior to the addition of a crosslinker.

The viscosified treatment fluids of the present invention also may comprise breakers capable of reducing the viscosity of the viscosified treatment fluid at a desired time. Examples of such suitable breakers for viscosified treatment fluids of the present invention include, but are not limited to, oxidizing agents such as sodium chlorites, sodium bromate, hypochlorites, perborate, persulfates, and peroxides, including organic peroxides. Other suitable breakers include, but are not limited to, suitable acids and peroxide breakers, delinkers, triethanol amine, as well as enzymes that may be effective in breaking xanthan. Examples of suitable acids may include, but are not limited to, hydrochloric acid, hydrofluoric acid, formic acid, acetic acid, citric acid, glycolic acid, etc. Another example of suitable breakers are those disclosed in U.S. patent application Ser. Nos. 11/502,656 and 11/656,601, the relevant disclosures of which are herein incorporated by reference. Preferred examples of peroxide breakers include tert-butyl hydroperoxide and tert-amyl hydroperoxide. A breaker may be included in a viscosified treatment fluid of the present invention in an amount and form sufficient to achieve the desired viscosity reduction at a desired time. The breaker may be formulated to provide a delayed break, if desired. For example, a suitable breaker may be encapsulated if desired. Suitable encapsulation methods are known to those skilled in the art. One suitable encapsulation method that may be used involves coating the chosen breakers with a material that will degrade when downhole so as to release the breaker when desired. Resins that may be suitable include, but are not limited to, polymeric materials that will degrade when downhole. The terms "degrade," "degradation," or "degradable" refer to both the two relatively extreme cases of degradation that the degradable material may undergo, i.e., heterogeneous (or bulk erosion) and homogeneous (or surface erosion), and any stage of degradation in between these two. This degradation can be a result of, inter alia, a chemical or thermal reaction or a reaction induced by radiation. Suitable examples of degradable materials include, but are not limited to, polysaccharides such as dextran or cellulose; chitins; chitosans; proteins; aliphatic polyesters; poly(lactides); poly(glycolides); poly($\epsilon$-caprolactones); poly(hydroxybutyrates); poly(anhydrides); aliphatic polycarbonates; orthoesters, poly(orthoesters); poly(amino acids); poly(ethylene oxides); and polyphosphazenes. If used, a breaker should be included in a treatment fluid of the present invention in an amount sufficient to facilitate the desired reduction in viscosity in a viscosified treatment fluid. For instance, peroxide concentrations that may be used vary from about 0.1 to about 30 gallons of peroxide per 1000 gallons of the viscosified treatment fluid.

Optionally, a viscosified treatment fluid of the present invention may comprise an activator or a retarder, inter alia, to optimize the break rate provided by the breaker. Any known activator or retarder that is compatible with the particular breaker used is suitable for use in the present invention. Examples of such suitable activators include, but are not limited to, acid generating materials, chelated iron, copper, cobalt, and reducing sugars. Examples of suitable retarders include sodium thiosulfate, methanol, and diethylene triamine. In some embodiments, the sodium thiosulfate may be used in a range of from about 1 to about 100 lbs/Mgal of viscosified treatment fluid. A preferred range may be from about 5 to about 20 lbs/Mgal. An artisan of ordinary skill with the benefit of this disclosure will be able to identify a suitable activator or retarder and the proper concentration of such activator or retarder for a given application.

The viscosified treatment fluids of the present invention also may comprise suitable fluid loss control agents. Such fluid loss control agents may be particularly useful when a viscosified treatment fluid of the present invention is being used in a fracturing application or in a fluid used to seal a formation from invasion of fluid from the well bore. Any fluid loss agent that is compatible with the viscosified treatment fluids of the present invention is suitable for use in the present invention. Examples include, but are not limited to, starches, silica flour, gas bubbles (energized fluid or foam), benzoic acid, soaps, resin particulates, relative permeability modifiers, degradable gel particulates, diesel or other hydrocarbons dispersed in fluid, and other immiscible fluids. Another example of a suitable fluid loss control additive is one that comprises a degradable material. Suitable examples of degradable materials include polysaccharides such as dextran or cellulose; chitins; chitosans; proteins; aliphatic polyesters; poly(lactides); poly(glycolides); poly(glycolide-co-lactides); poly($\epsilon$-caprolactones); poly(3-hydroxybutyrates); poly(3-hydroxybutyrate-co-hydroxyvalerates); poly(anhydrides); aliphatic poly(carbonates); poly(orthoesters); poly(amino acids); poly(ethylene oxides); poly(phosphazenes); derivatives thereof; or combinations thereof. If included, a fluid loss additive should be added to a viscosified treatment fluid of the present invention in an amount necessary to give the desired fluid loss control. In some embodiments, a fluid loss additive may be included in an amount of about 5 to about 2000 lbs/Mgal of the viscosified treatment fluid. In some embodiments, the fluid loss additive may be included in an amount from about 10 to about 50 lbs/Mgal of the viscosified treatment fluid. For some liquid additives like diesel, these may be included in an amount from about 0.01% to about 20% by volume; in some embodiments, these may be included in an amount from about 1.0% to about 10% by volume.

In certain embodiments, a stabilizer may optionally be included in the viscosified treatment fluids of the present invention. It may be particularly advantageous to include a stabilizer if a chosen viscosified treatment fluid is experiencing a viscosity degradation. One example of a situation where a stabilizer might be beneficial is where the BHT of the well bore is sufficient by itself to break the viscosified treatment fluid without the use of a breaker. Suitable stabilizers include, but are not limited to, sodium thiosulfate, methanol, and salts such as formate salts and potassium or sodium chloride. Another example of a suitable stabilizer includes surfactants, such as those in U.S. patent application Ser. No. 11/418,617, the relevant disclosure of which is herein incorporated by reference. Such stabilizers may be useful when the viscosified treatment fluids of the present invention are utilized in a subterranean formation having a temperature above about 200° F. If included, a stabilizer may be added in an amount of from about 1 to about 50 lbs/Mgal of viscosified treatment fluid. In other embodiments, a stabilizer may be included in an amount of from about 5 to about 20 lbs/Mgal of viscosified treatment fluid. In certain embodiments where the stabilizer chosen is a salt, the stabilizer may be included in an amount of from about 5 lbs/Mgal to about saturation of the treatment fluid. In certain embodiments where the stabilizer chosen is a surfactant, the stabilizer may be included in an amount of from about 0.001% to about 5.0% of the treatment fluid.

Scale inhibitors may be added to the viscosified treatment fluids of the present invention, for example, when a viscosified treatment fluid of the present invention is not particularly compatible with the formation waters in the formation in which it is being used. This may include water soluble organic molecules with carboxylic acid, aspartic acid, maleic acids, sulphonic acids, phosphonic acid and phosphate esters groups including copolymers, ter-polymers, grafted copolymers, and derivatives thereof. Examples of such compounds include aliphatic phosphonic acids such as diethylene triamine penta (methylene phosphonate) and polymeric species such as polyvinylsulphonate. The scale inhibitor may be in the form of the free acid but is preferably in the form of mono and polyvalent cation salts such as Na, K, Al, Fe, Ca, Mg, $NH_4$. Any scale inhibitor that is compatible with the viscosified treatment fluid in which it will be used in suitable for use in the present invention. An example of a suitable scale inhibitor is SCALECHEK LP-55™ scale inhibitor commercially available from Halliburton Energy Services in Duncan, Okla. Another example of a suitable scale inhibitor is "LP-65™" scale inhibitor commercially available from Halliburton Energy Services in Duncan, Okla. If used, a scale inhibitor should be included in an amount effective to inhibit scale formation. Suitable amounts of scale inhibitors that may be included in the viscosified treatment fluids of the present invention may range from about 0.05 to 100 gallons per about 1000 gallons of the viscosified treatment fluid.

Any particulates such as proppant and/or gravel that are commonly used in subterranean operations may be used in the present invention (e.g., sand, gravel, bauxite, ceramic materials, glass materials, polymer materials, wood, plant and vegetable matter, nut hulls, walnut hulls, cotton seed hulls, cement, fly ash, fibrous materials, composite particulates, hollow spheres and/or porous proppant). It should be understood that the term "particulate," as used in this disclosure, includes all known shapes of materials including substantially spherical materials, oblong, ellipsoid, rod-like, polygonal materials (such as cubic materials), mixtures thereof, derivatives thereof, and the like. In some embodiments, resin and/or tackifying agent coated particulates may be suitable for use in the treatment fluids of the present invention. In addition, proppants that have been chemically treated or coated may also be used. The term "coated" does not imply any particular degree of coverage of the proppant particulates with the resin and/or tackifying agent. Examples of tackifying agents suitable for coating particulates are described in U.S. Pat. Nos. 5,853,048; 5,833,000; 5,582,249; 5,775,425; 5,787,986, 7,131,491 the relevant disclosures of which are herein incorporated by reference. An example of a suitable commercially available tackifying agent is the SANDWEDGE® conductivity enhancement system sold by Halliburton Energy Services, Inc. of Duncan, Okla. Examples of resins suitable for coating particulates are described in U.S. Pat. Nos. 6,668,926; 6,729,404; and 6,962,200.

The viscosified treatment fluids of the present invention may be provided and introduced into the subterranean formation in certain embodiments of the present invention by any means known in the art. The treatment fluid may be prepared at the job site, prepared at a plant or facility prior to use, or certain components of the treatment fluid (e.g., the base fluid and the gelling agent) may be pre-mixed prior to use and then transported to the job site. Certain components of the treatment fluid may be provided as a "dry mix" to be combined with the base fluid and/or other components prior to or during introducing the treatment fluid into the subterranean formation.

In certain embodiments, the preparation of these viscosified treatment fluids of the present invention may be done at the job site in a method characterized as being performed "on-the-fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing. In some embodiments of the present invention, the gelling agent comprising clarified xanthan may be mixed into the base fluid on-the-fly.

In certain embodiments, the treatment fluid may be introduced into the subterranean formation by pumping the treatment fluid into a well bore that penetrates a portion of the subterranean formation. In certain embodiments (e.g., fracturing operations), the treatment fluid may be introduced into the subterranean formation at or above a pressure sufficient to create or enhance one or more fractures in a portion of the subterranean formation.

In some embodiments, the viscosified treatment fluids of the present invention may be placed in a subterranean formation utilizing a hydrajet tool. The hydrajet tool may be capable of increasing or modifying the velocity and/or direction of the flow of a fluid into a subterranean formation from the velocity and/or direction of the flow of that fluid down a well bore. One of the potential advantages of using a hydrajet tool is that a fluid may be introduced adjacent to and localized to specific areas of interest along the well bore without the use of mechanical or chemical barriers. Some examples of suitable hydrajet tools are described in U.S. Pat. Nos. 5,765,642, 5,494,103, and 5,361,856, the relevant portions of which are hereby incorporated by reference.

In some embodiments in which a hydrajet tool is used, the fluid(s) introduced through the hydrajet tool are introduced at a pressure sufficient to result in the creation of at least one new fracture in the formation. In one example of a hydrajetting operation carried out at an elevated pressure, a hydrajetting tool having at least one fluid jet forming nozzle is positioned adjacent to a formation to be fractured, and fluid is then jetted through the nozzle against the formation at a pressure sufficient to form a cavity, or slot therein to fracture the formation by stagnation pressure in the cavity. Because the jetted fluids would have to flow out of the slot in a direction generally opposite to the direction of the incoming jetted fluid, they are trapped in the slot and create a relatively high stagnation pressure at the tip of a cavity. This high stagnation pressure may cause a micro-fracture to be formed that extends a short distance into the formation. That micro-fracture may be further extended by pumping a fluid into the well bore to raise the ambient fluid pressure exerted on the formation while the formation is being hydrajetted. Such a fluid in the well bore will flow into the slot and fracture produced by the fluid jet and, if introduced into the well bore at a sufficient rate and pressure, may be used to extend the fracture an additional distance from the well bore into the formation.

The methods and treatment fluids of the present invention may be used during or in preparation for any subterranean operation wherein a fluid may be used. Suitable subterranean operations may include, but are not limited to, drilling operations, hydraulic fracturing treatments, fracturing treatments such as those disclosed in U.S. patent application Ser. No. 11/506,703, the relevant disclosure of which is hereby incorporated by reference, sand control treatments (e.g., gravel packing), acidizing treatments (e.g., matrix acidizing, fracture acidizing, removal of filter cakes and fluid loss pills), "frac-pack" treatments, well bore clean-out treatments, and other suitable operations where a treatment fluid of the present invention may be useful. The treatment fluids of the present invention may also be used in conjunction with a remedial treatment utilizing vibrational waves, an example of which is disclosed in U.S. Patent Application No. 2006/0131012, the relevant disclosure of which is herein incorporated by reference. In addition, the treatment fluids of the present invention may also be used to reduce friction, as a spacer fluid, insulation fluid, as a diverter, as a fluid loss pill, as a water control fluid in water flood fluids for tertiary oil recovery, as part of a drilling fluid, as a chemical pig in a well bore, or as a chemical pig in a pipeline. In some embodiments, the treatment fluid may also comprise a cement slurry.

In one embodiment, the present invention provides a method comprising providing a viscosified treatment fluid comprising a base fluid and a gelling agent that comprises a clarified xanthan; and placing the viscosified treatment fluid into at least a portion of a subterranean formation.

In another embodiment, the present invention provides a method comprising providing a viscosified treatment fluid comprising a base fluid and a gelling agent that comprises a clarified xanthan; and placing the viscosified treatment fluid into at least a portion of a subterranean formation at a pressure sufficient to create or enhance at least one fracture in the subterranean formation.

In yet another embodiment, the present invention provides a method comprising providing a viscosified treatment fluid comprising a base fluid, a plurality of particulates, and a gelling agent that comprises a clarified xanthan; and placing the viscosified treatment fluid into at least a portion of a subterranean formation.

In yet another embodiment, the present invention provides a method comprising providing a viscosified treatment fluid comprising a base fluid and a gelling agent that comprises a clarified xanthan; and placing the viscosified treatment fluid into at least a portion of a pipeline.

To facilitate a better understanding of the present invention, the following examples of some of the preferred embodiments are given. In no way should such examples be read to limit, or define, the scope of the invention.

Example 1

Filterability testing was conducted for several xanthan gelled fluids. Nine 1000 mL volume samples of xanthan gelled fluids were prepared.

Sample 1 contained a xanthan gelling agent obtained from Kelco Oil Field Group, Inc., available under the tradename XANVIS.

Samples 2 and 3 contained a xanthan gelling agent obtained from Rhone-Poulenc Chimie Fine, available under the tradenames RHODOPOL 23 and RHODOPOL 23 P, respectively.

Sample 4 contained a xanthan gelling agent obtained from Drilling Specialties Company, available under the tradename FLOWZAN.

Sample 5 contained a xanthan gelling agent obtained from Cargill Inc., available under the name Cargill Industrial Grade with Lot #030613410.

Samples 6-9 contained a xanthan gelling agent obtained from Kelco Oil Field Group, Inc., available under the tradenames KETROL TF, KELTROL T, KELTROL BT, and KELTROL BT, respectively.

Each 1000 mL sample was prepared by adding the additives in the order disclosed in Table 1. Each sample was prepared in a 1-Liter Waring Commercial Blender Model #31BL41. The top of the blender jar was sealed before the mixing was started to prevent air entrainment into the fluid.

TABLE 1

| Additive | Amount to Prepare 1000 mL |
|---|---|
| Fresh Water | 918.1 mL |
| Citric Acid | 0.94 gram |
| 20° Be HCl Acid | 0.50 mL |
| Xanthan Gelling Agent | 7.20 grams |
| 25% NaOH Solution | 5.40 mL |
| KCl | 194.00 grams |
| 20° Be HCl Acid | Sufficient to lower pH to approximately 7.5 |

Once the xanthan gelling agent was added, mixing was continued until the xanthan gelling agent was dispersed. The NaOH solution was added and mixing was continued for several minutes. The Waring blender was turned off and the gel was allowed to hydrate for a period of at least 30 minutes. The KCl was then added and blended into the gelled fluid sample. A sufficient amount of HCl acid was added to adjust the gelled fluid pH to approximately 7.5.

A 250-300 mL volume of the sheared gelled fluid sample was placed in one of the cells of a Baroid Fann Filter Press Model 12BL. Whatman #50 filter paper, 9.0 cm in diameter, was used in the filter press cell. To obtain the filterability measurements, a beaker with 50 mL graduations was placed beneath the exit port of the filter press cell and 40 psi air pressure was applied to the cell. The time required for each 50 mL volume of fluid to collect in the beaker was recorded. The test was terminated when all of the fluid had exited the cell or if 10-15 minutes had passed without all of the fluid exiting the filter press cell.

The results of this test are displayed below in Table 2.

TABLE 2

| Sample | Product Name | 50 mL | 100 mL | 150 mL | 200 mL | 250 mL |
|---|---|---|---|---|---|---|
| 1 | XANVIS | 25 sec. | 2 min. 10 sec. | greater than 25 min. | — | — |
| 2 | RHODOPOL 23 | 16 sec. | 1 min. | greater than 10 min. | — | — |
| 3 | RHODOPOL 23 P | 28 sec. | 1 min 38 sec. | greater than 10 min. | — | — |
| 4 | FLOWZAN | 1 min. | greater than 10 min. | — | — | — |

TABLE 2-continued

| Sample | Product Name | 50 mL | 100 mL | 150 mL | 200 mL | 250 mL |
|---|---|---|---|---|---|---|
| 5 | CARGILL INDUSTRIAL GRADE | 1 min. | greater than 15 min. | — | — | — |
| 6 | KELTROL TF | 33 sec | 3 min 6 sec | greater than 20 min | — | — |
| 7 | KELTROL T | — | 23 sec | 47 sec | 1 min 28 sec | 2 min 25 sec |
| 8 | KELTROL BT | 8 sec | — | 19 sec | 27 sec | 36 sec |
| 9 | KELTROL BT | 12 sec | 20 sec | 28 sec | 38 sec | 51 sec |

Thus, Example 1 demonstrates, inter alia, that examples of clarified xanthan include those clarified xanthan gelling agents used in Samples 7-9.

Example 2

In the following example, rheology studies were performed on various xanthan gelled fluids to demonstrate the crosslinking behavior of xanthan with both an aluminum-based crosslinker and a zirconium-based crosslinker.

Sample 10 was a treatment fluid that comprised 40 pounds of a viscosifying agent, commercially available under the tradename WG-37™, per 1000 gallons of Duncan tap water, 1% by weight potassium chloride, and no crosslinker solution.

Sample 11 was a treatment fluid that comprised 40 pounds of a viscosifying agent, commercially available under the tradename WG-37™, per 1000 gallons of Duncan tap water, 1% by weight potassium chloride, and 5 gallons per 1000 gallons of an aluminum acetate crosslinker solution.

Sample 12 was a treatment fluid that comprised 40 pounds of a viscosifying agent, commercially available under the tradename WG-37™, per 1000 gallons of Duncan tap water, 1% by weight potassium chloride, and 6.25 gallons per 1000 gallons of an aluminum acetate crosslinker solution.

Sample 13 was a treatment fluid that comprised 40 pounds of a viscosifying agent, commercially available under the tradename WG-37™, per 1000 gallons of Duncan tap water, 1% by weight potassium chloride, and 7.5 gallons per 1000 gallons of an aluminum acetate crosslinker solution.

Sample 14 was a treatment fluid that comprised 40 pounds of a viscosifying agent, commercially available under the tradename WG-37™, per 1000 gallons of Duncan tap water, 1% by weight potassium chloride, and 10 gallons per 1000 gallons of an aluminum acetate crosslinker solution.

Sample 15 was a treatment fluid that comprised 40 pounds of a viscosifying agent, commercially available under the tradename WG-37™, per 1000 gallons of Duncan tap water, 1% by weight potassium chloride, and 10 gallons per 1000 gallons of a zirconium crosslinker solution.

The viscosity at $100 \text{ s}^{-1}$ of Samples 10-15 was measured using a M5600 high temperature, high pressure rheometer from Grace Instrument Company affixed with a B5X bob and R1 cup. After the sample was placed in the cup and on the instrument, about 400 psig of nitrogen was supplied to the sample to prevent significant sample evaporation during the course of the experiment. Afterwards, shear was applied to the sample at $100 \text{ s}^{-1}$, and the sample was plunged into an oil bath at 200° F. After shear was applied, viscosity and sample temperature were collected every 3 seconds. FIG. 1 represents the viscosity curve of each sample.

Thus, Example 2 demonstrates, inter alia, that both zirconium and aluminum acetate solutions may effectively crosslink xanthan, and in some cases may increase the viscosity of a fluid by as much as 2 or 3 times of the base gel viscosity.

Example 3

In the following example, rheology studies were performed on various xanthan gelled fluids to demonstrate the crosslinking behavior of xanthan with an aluminum-based crosslinker and an amine-based crosslinker.

Base xanthan gelled fluids were mixed in a Waring Blender by dissolving 40 pounds of the viscosifying agent per 1000 gallons of Duncan tap water. A pH buffer and 1% sodium chloride were added to adjust the pH for the viscosity tests. The base xanthan gelled fluid was allowed to hydrate for at least 60 minutes before adding the crosslinker.

Sample 16 was a treatment fluid that comprised 40 pounds of a viscosifying agent, commercially available under the tradename WG-37™, per 1000 gallons of Duncan tap water, 1% by weight sodium chloride, 2 gallons per 1000 gallons potassium carbonate buffer (pH 10), and 0.8 gallons per 1000 gallons of a triethanol amine complex of titanium crosslinker solution.

Sample 17 was a treatment fluid that comprised 40 pounds of a viscosifying agent, commercially available under the tradename WG-37™, per 1000 gallons of Duncan tap water, 1% by weight sodium chloride, 5 gallons per 1000 gallons acetate buffer (pH 4), and 0.5 gallons per 1000 gallons of an alkanolamine chelate of zirconium alkoxide in propyl alcohol crosslinker solution.

Sample 18 was a treatment fluid that comprised 40 pounds of a viscosifying agent, commercially available under the tradename WG-37™, per 1000 gallons of Duncan tap water, 1% by weight sodium chloride, 0.15 gallons per 1000 gallons acetate buffer (pH 6), and 1.0 gallons per thousand gallons of an aluminum acetate crosslinker solution.

The viscosity at $100 \text{ s}^{-1}$ of Samples 16-18 was measured using a Brookfield PVS viscometer affixed with a B5X Hasteloy bob and cup. A 35 mL sample of gelled fluid was transferred to the viscometer cup at 75° F. and placed on the viscometer. The bath was preheated to test temperature. Viscosity was monitored at constant $100 \text{ s}^{-1}$ until maximum temperature was reached and for duration of the test time. FIG. 3 represents the viscosity curve of each sample.

Thus, Example 3 demonstrates, inter alia, that both aluminum-based and amine-based crosslinker solutions may effectively crosslink xanthan.

Example 4

In the following example, rheology studies were performed on various xanthan/hydroxy propyl guar gelled fluids to demonstrate the various behaviors of the samples.

Each sample was prepared by first placing 1000 mL of Duncan tap water into a Waring blender. The blender speed was adjusted until a vortex was formed in the water. In those samples where potassium chloride ("KCl") was added (indicated in Table 3 below), the KCl was added and allowed to disperse prior to the addition of the viscosifying agent.

A hydroxy propyl guar viscosifying agent, commercially available under the tradename WG-11™, was added to the water in an amount indicated in Table 3 and allowed to disperse. A sodium acetate buffer was added in an amount of 0.1 gallons per 1000 gallons for hydration. The fluid was stirred for 15 minutes and allowed to sit static for 15 minutes for a total of 30 minutes hydration.

After hydration was complete, the appropriate amount of a xanthan viscosifying agent, commercially available under the tradename WG-37™, was added to the fluid to bring the total gel loading to either 40 or 60 pounds per 1000 gallons, as indicated in Table 3. The fluid was stirred for five minutes to allow the viscosifying agent to hydrate. A pH control agent, commercially available from Halliburton Energy Services, Inc., of Duncan, Okla., under the tradename MO-67™, was then added in an amount of 0.4 gallons per 1000 gallons to bring the pH to 10.5. After the pH was adjusted to 10.5, 2 gallons per 1000 gallons of a borate crosslinker, commercially available under the tradename CL-31™, was added to the fluid and the vortex closure time, static roll time, and lipping crosslink times were measured and recorded.

The results are displayed below in Table 3.

TABLE 3

| Total Gel Loading | Base Gel pH | Salt/Conc. | % WG-11 | % WG-37 | Vortex Closure (sec.) | Static Roll (sec.) | Lipping Crosslink (sec.) |
|---|---|---|---|---|---|---|---|
| 40 | 10.5 | None | 50 | 50 | 7 | 22 | 30 |
| 40 | 10.5 | None | 40 | 60 | 18 | 45 | 55 |
| 40 | 10.5 | None | 30 | 70 | 26 | 60 | 90 |
| 60 | 10.5 | 7% KCl | 20 | 80 | 15 | 45 | 60 |
| 60 | 10.5 | 7% KCl | 10 | 90 | 60 | N/A | * |

*In four minutes the fluid had weak lipping crosslink, although it was brittle and would not maintain lip for five seconds.

Example 5

In the following example, rheology studies were performed on xanthan gelled fluids to demonstrate the on the fly crosslinking behavior of the samples.

Each sample was prepared by first placing 1000 mL of Duncan tap water into a Waring blender. The blender speed was adjusted until a vortex was formed in the water. A 6% sodium chloride solution was added to one sample and a 3% calcium chloride solution was added to the other, as indicated in Table 4 below. A pH control agent, commercially available from Halliburton Energy Services, Inc., of Duncan, Okla., under the tradename MO-67™, was then added in an amount of 0.4 gallons per 1000 gallons to bring the pH to 10.5. After the pH was adjusted to 10.5, 2 gallons per 1000 gallons of a borate crosslinker, commercially available under the tradename CL-31™, and 2 gallons per 1000 gallons of another borate crosslinker, commercially available under the tradename CL-28M™, was added to the fluid and allowed to disperse.

After all additives had been added to the blender jar and allowed to disperse, 80 pounds per 1000 gallons of a xanthan viscosifying agent, commercially available under the tradename WG-37™, was added to the blender jar and allowed to disperse. The fluid was stirred in a Waring blender until the first reading at 5 minutes was taken. The apparent viscosity at 511 s$^{-1}$ on a FANN 35 viscometer was then measured over 30 minutes. The results are displayed below in Table 4.

TABLE 4

|  | 5 min. | 7 min. | 10 min. | 15 min. | 20 min. | 25 min. | 30 min. |
|---|---|---|---|---|---|---|---|
| Apparent Viscosity for Sample Comprising 6% sodium chloride solution | 47 cP | 55 cP | 56 cP | 58 cP | 61 cP | 63 cP | 65 cP |
| Apparent Viscosity for Sample Comprising 3% calcium chloride solution | 54 cP | 60 cP | 63 cP | 66 cP | 67 cP | 67 cP | N/A |

Thus, Example 5 demonstrates, inter alia, that the viscosifying agent does not crosslink too rapidly so as to prevent the dispersion of additives, which thereby allows the mixing to be performed on the fly.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Moreover, the indefinite articles "a" and "an", as used in the claims, is defined herein to mean one or more than one of the element that it introduces. Also, the terms in the claims have their plain, ordinary meaning unless otherwise explicitly and clearly defined by the patentee.

What is claimed is:

1. A method comprising:
providing a viscosified treatment fluid comprising a base fluid and a gelling agent that comprises a clarified xanthan wherein the gelling agent is included in the viscosified treatment fluid is an amount from about 0.25 lbs to about 200 lbs per 1000 gallons of the viscosified treatment fluid; and
placing the viscosified treatment fluid into at least a portion of a subterranean formation.

2. The method of claim 1 wherein the viscosified treatment fluid further comprises a breaker selected from the group consisting of an acid, an acid generating material, an oxidizing agent, and an enzyme.

3. The method of claim 2 wherein the breaker has a coating.

4. The method of claim 1 wherein the base fluid comprises an aqueous fluid selected from the group consisting of fresh water, salt water, brine, formation brine, and seawater.

5. The method of claim 1 wherein the viscosified treatment fluid is foamed.

6. The method of claim 1 wherein the viscosified treatment fluid further comprises a pH control additive selected from the group consisting of a base, a chelating agent, an acid, a combination of a base and a chelating agent, and a combination of an acid and a chelating agent.

7. The method of claim 1 wherein the viscosified treatment fluid further comprises a surfactant in an amount in the range of from about 0.1% to about 5% by volume of the viscosified treatment fluid.

8. The method of claim 1 wherein the viscosified treatment fluid further comprises a crosslinker selected from the group consisting of a boron derivative, a salt of a perborate, a salt of a permanganate, a salt of a percarbonate, a salt of a persulfate, a ferric iron derivative, a titanium derivative, a zirconium derivative, an aluminum derivative, a magnesium derivative, and glutaraldehyde.

9. The method of claim 1 wherein the viscosified treatment fluid further comprises an activator or a retarder.

10. The method of claim 1 wherein the viscosified treatment fluid further comprises a salt, a bactericide, a fluid loss control agent, a stabilizer, a chelant, a scale inhibitor, a tackifying agent, a resin, a consolidating agent, a conductivity endurance enhancing agent, or a combination thereof.

11. The method of claim 1 wherein the viscosified treatment fluid comprises an emulsion.

12. The method of claim 1 wherein the viscosified treatment fluid is selected from the group consisting of: a fracturing fluid, a gravel packing fluid, an acidic fluid, a friction reducing fluid, a spacer fluid, an insulation fluid, a diverting fluid, a fluid loss pill, a scale removal fluid, and a chemical pig.

13. A method comprising:
providing a viscosified treatment fluid comprising a base fluid and a gelling agent that comprises a clarified xanthan wherein the gelling agent is included in the viscosified treatment fluid is an amount from about 0.25 lbs to about 200 lbs per 1000 gallons of the viscosified treatment fluid; and
placing the viscosified treatment fluid into at least a portion of a subterranean formation at a pressure sufficient to create or enhance at least one fracture in the subterranean formation.

14. The method of claim 13 wherein the viscosified treatment fluid is placed into at least a portion of a subterranean formation using a hydrajet tool.

15. A method comprising:
providing a viscosified treatment fluid comprising a base fluid, a plurality of proppant particulates, and a gelling agent that comprises a clarified xanthan; and
placing the viscosified treatment fluid into at least a portion of a subterranean formation.

16. The method of claim 15 further comprising placing the viscosified treatment fluid into at least a portion of a subterranean formation at a pressure sufficient to create or enhance at least one fracture in the subterranean formation.

17. The method of claim 15 wherein the gelling agent is included in the viscosified treatment fluid is an amount from about 0.25 lbs to about 200 lbs per 1000 gallons of the viscosified treatment fluid.

18. A method comprising:
providing a viscosified treatment fluid comprising a base fluid and a gelling agent that comprises a clarified xanthan wherein the gelling agent is included in the viscosified treatment fluid is an amount from about 0.25 lbs to about 200 lbs per 1000 gallons of the viscosified treatment fluid; and
placing the viscosified treatment fluid into at least a portion of a pipeline.

* * * * *